US008627420B2

(12) United States Patent
Furlan et al.

(10) Patent No.: US 8,627,420 B2
(45) Date of Patent: Jan. 7, 2014

(54) APPARATUS FOR ASSOCIATING A CLIENT DEVICE OR SERVICE WITH A WIRELESS NETWORK

(75) Inventors: John Furlan, Belmont, CA (US); Siddhartha Dattagupta, Irvine, CA (US); Chris Bainer, San Marcos, CA (US); Insung Kim, Irvine, CA (US); Ariel Braunstein, San Francisco, CA (US); Jonathan Kaplan, San Francisco, CA (US)

(73) Assignee: Cisco Technologies, Inc., San Jose, CA (US)

( * ) Notice: Subject to any disclaimer, the term of this patent is extended or adjusted under 35 U.S.C. 154(b) by 111 days.

(21) Appl. No.: 13/092,079

(22) Filed: Apr. 21, 2011
(Under 37 CFR 1.47)

(65) Prior Publication Data
US 2011/0265154 A1    Oct. 27, 2011

Related U.S. Application Data

(60) Provisional application No. 61/327,072, filed on Apr. 22, 2010.

(51) Int. Cl.
*G06F 21/00* (2013.01)
(52) U.S. Cl.
USPC .............. 726/5; 709/203; 709/223; 713/156; 713/168; 380/255; 380/270; 705/3
(58) Field of Classification Search
USPC ......................................................... 726/3, 5
See application file for complete search history.

(56) References Cited

U.S. PATENT DOCUMENTS

| | | | | |
|---|---|---|---|---|
| 7,812,828 | B2* | 10/2010 | Westerman et al. | 345/173 |
| 7,886,033 | B2* | 2/2011 | Hopmann et al. | 709/223 |
| 8,037,202 | B2* | 10/2011 | Yeager et al. | 709/238 |
| 8,271,395 | B2* | 9/2012 | Dominguez et al. | 705/65 |
| 2005/0246292 | A1* | 11/2005 | Sarcanin | 705/67 |
| 2007/0205275 | A1* | 9/2007 | Nicola et al. | 235/383 |
| 2008/0281787 | A1* | 11/2008 | Arponen et al. | 707/3 |
| 2009/0019141 | A1* | 1/2009 | Bush et al. | 709/223 |
| 2009/0227282 | A1* | 9/2009 | Miyabayashi et al. | 455/552.1 |
| 2010/0063867 | A1* | 3/2010 | Proctor et al. | 705/10 |
| 2010/0093429 | A1* | 4/2010 | Mattice et al. | 463/25 |
| 2010/0274859 | A1* | 10/2010 | Bucuk | 709/206 |
| 2010/0283586 | A1* | 11/2010 | Ikeda et al. | 340/10.42 |
| 2011/0007901 | A1* | 1/2011 | Ikeda et al. | 380/270 |
| 2011/0151890 | A1* | 6/2011 | Platt et al. | 455/456.1 |
| 2011/0165836 | A1* | 7/2011 | Dixon et al. | 455/41.1 |
| 2011/0251892 | A1* | 10/2011 | Laracey | 705/14.51 |
| 2011/0302014 | A1* | 12/2011 | Proctor et al. | 705/14.23 |
| 2012/0254955 | A1* | 10/2012 | Suginaka et al. | 726/4 |

OTHER PUBLICATIONS

Service Discovery in Pervasive Computing Environments|http://www.informatik.hs-furtwangen.de/~hanne/Pervasive/ServiceDiscovery.pdf|Zhu et al.|2005|pp. 1-10.*

* cited by examiner

*Primary Examiner* — Mahfuzur Rahman
(74) *Attorney, Agent, or Firm* — Patterson & Sheridan, LLP

(57) ABSTRACT

A network association apparatus includes identification information and an authorization credential associated with a specific client device or service to be connected to a wireless network. The apparatus is configured to automatically provide the identification information and the authorization credential to a host device of a wireless network in a secure fashion when brought into close proximity to or physically connected with the host of the wireless network. The apparatus may comprise an RFID tag.

14 Claims, 8 Drawing Sheets

APPARATUS FOR ASSOCIATING A CLIENT DEVICE OR SERVICE WITH A WIRELESS NETWORK

CROSS-REFERENCE TO RELATED APPLICATIONS

This application claims benefit of U.S. provisional patent application Ser. No. 61/327,072, filed Apr. 22, 2010, which is herein incorporated by reference in its entirety.

BACKGROUND

1. Technical Field

Embodiments of the present invention relate generally to wireless networks and, more specifically, to an apparatus for associating a client device or service with a wireless network.

2. Description of the Related Art

Home networks, in which multiple computing and/or peripheral devices are communicatively linked together in a consumer's home, are becoming increasingly ubiquitous. A home environment may include one or more computers, a wireless router, a DSL modem, and one or more other client devices capable of connecting to the home network. Conventionally, each device in the home network must be individually configured to connect to the network and, once configured, may then communicate with each of the other devices attached to the home network.

In practice, procedures for associating client devices and provisioning services on a home network are typically too involved for the majority of home network users to implement reliably. For example, a network user may need to manually reconfigure the home network router, determine a network IP address and/or hostname for each client device, establish network credentials, register the various services for each device, and manually track which network IP address is associated with which client device or service in order to configure client devices to communicate on the home network.

The involved configuration procedures described above make it a challenge for unsophisticated users to reliably setup a home network and associate client devices or services on the home network. Accordingly, there is a need in the art for systems and methods that enable the user of a home network to conveniently and securely connect one or more devices or services to the home network.

BRIEF DESCRIPTION OF THE DRAWINGS

So that the manner in which the above recited features of the present invention can be understood in detail, a more particular description of the invention may be had by reference to example embodiments, some of which are illustrated in the appended drawings. It is to be noted, however, that the appended drawings illustrate only example embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one example embodiment may be incorporated in other example embodiments without further recitation.

DESCRIPTION OF EXAMPLE EMBODIMENTS

In the following description, numerous specific details are set forth to provide a more thorough understanding of various example embodiments of the invention. However, it will be apparent to one of skill in the art that certain embodiments of the invention may be practiced without one or more of these specific details. In other instances, well-known features have not been described in order to avoid obscuring the invention.

Overview

One example embodiment of the present invention sets forth an apparatus, comprising a memory and a controller. The memory includes identification information for connecting a client device or service to a wireless network and an authorization credential associated with the client device or service. The controller is coupled to the memory and configured to automatically provide the identification information and the authorization credential to a host device of the wireless network.

Another example embodiment of the present invention sets forth a system comprising a network association apparatus and a host device of a wireless network. The network association apparatus includes a memory that includes identification information for connecting a client device or service to a wireless network and the authorization credential associated with the client device or service and a controller that is coupled to the memory and configured to provide the identification information and the authorization credential to the host device of the wireless network. The host device of the wireless network is configured to automatically obtain the identification information and the authorization credential from the network association apparatus.

Yet another example embodiment of the present invention sets forth a method that comprises detecting an apparatus associated with a client device or service, automatically obtaining from the apparatus identification information and an authorization credential associated with the client device or service, receiving a registration request from the client device or service, and associating the client device or service with a wireless network based on the identification information and an authorization credential.

DETAILED DESCRIPTION OF THE FIGURES

Figure 1A:
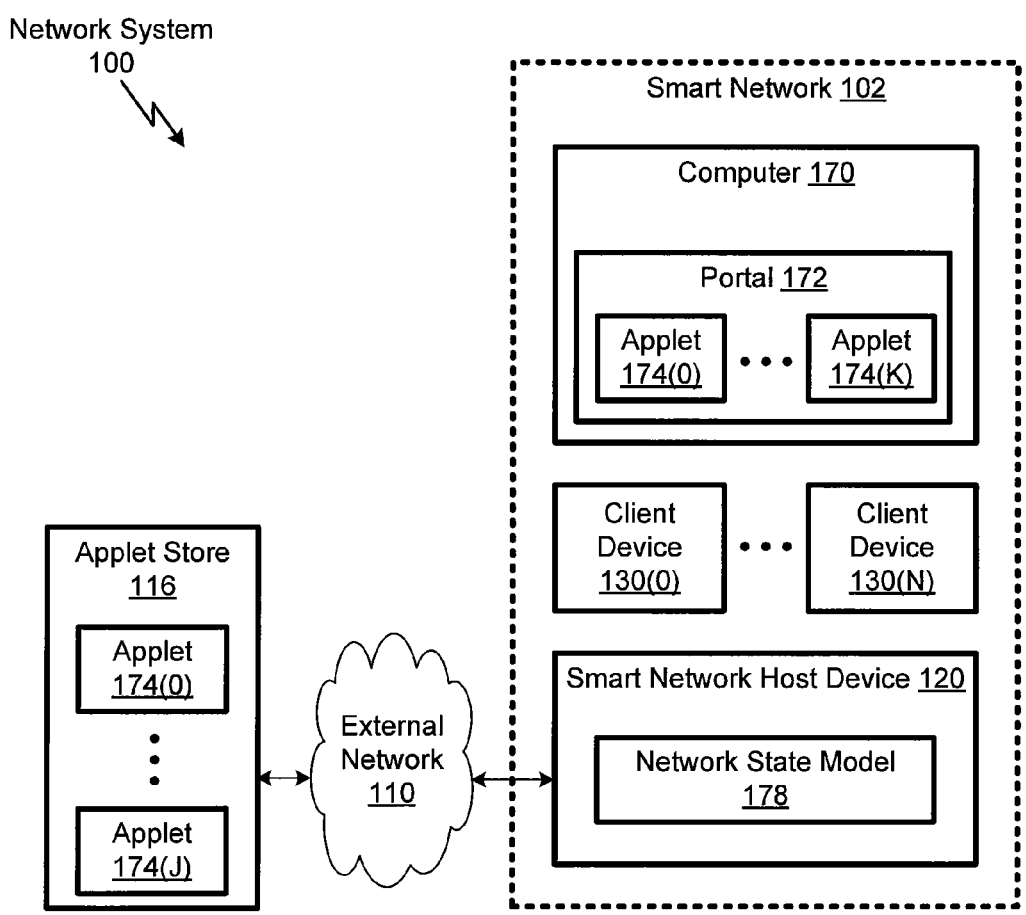
FIG. 1A is an exemplary illustration of an overarching network system configured to implement one or more aspects of the present invention.

FIG. 1A is an exemplary illustration of an overarching network system 100 configured to implement one or more aspects of the present invention. The network system 100 comprises a smart network 102, an external network 110, and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
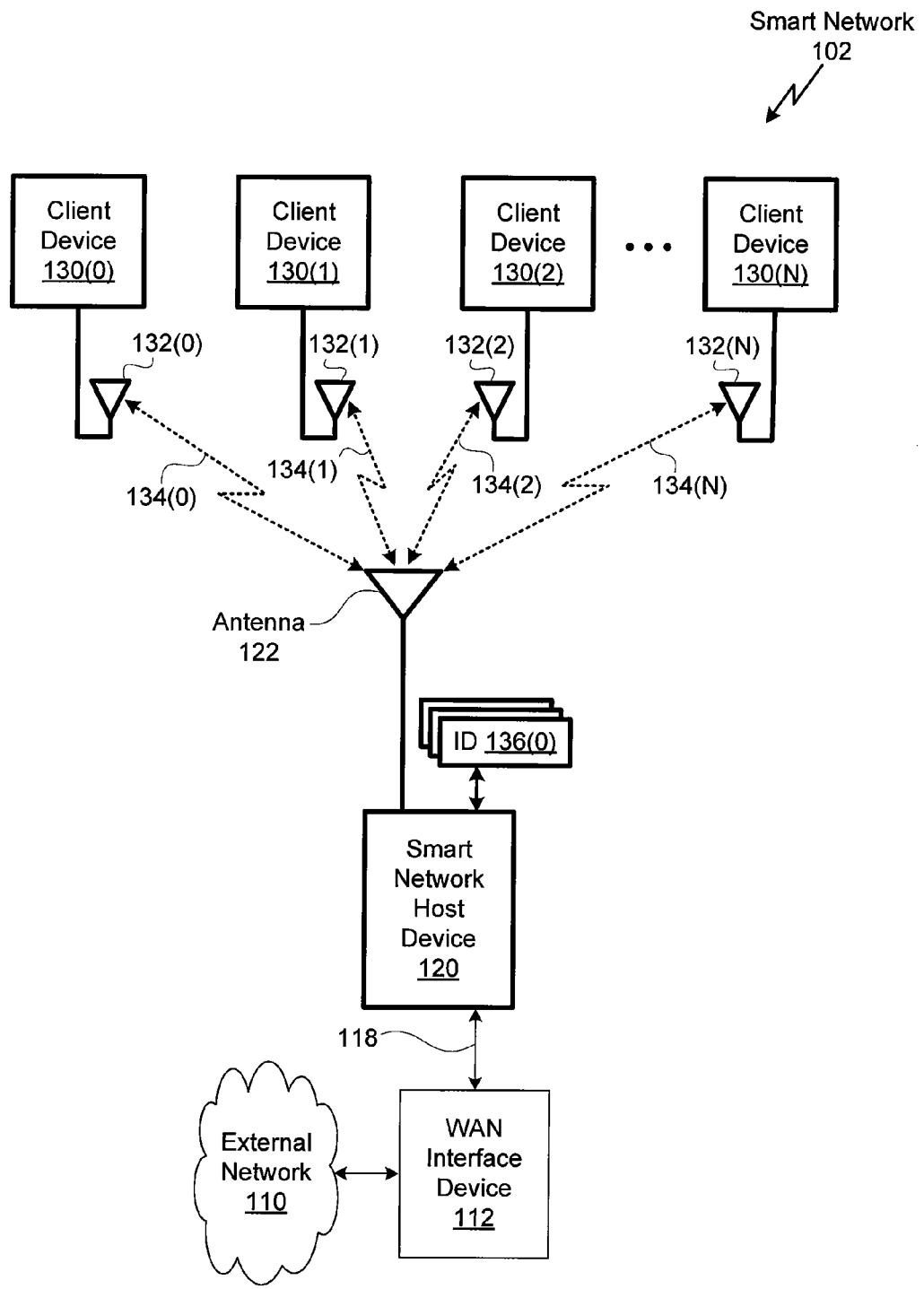
FIG. 1B illustrates the smart home network of FIG. 1A, according to one example embodiment of the present invention.

FIG. 1B illustrates the smart home network 102 of FIG. 1A, according to one example embodiment of the present invention. As shown, the smart network 102 comprises a smart network host device 120, one or more client devices 130, and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured establish wireless client links 134 to antennas 132 coupled to corresponding client devices 130. The smart network host device 120 implements layer 2 forwarding (bridging) for wireless data packets forwarded among client devices 130 as well as Internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one embodiment, authentication is implemented via Identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of the present invention. For example, in another embodiment, the ID devices 136 could be implemented as a physical token that includes a printed bar code on a face of the token. The bar code may encode authentication credentials for a corresponding client device 130. In such an embodiment, the smart network host device 120 may include an optical scanner capable of reading the printed bar code from the physical token. In alternative embodiments, other forms of ID devices 136 may implement storage of the authentication credentials. For example, a universal serial bus (USB) storage device may be used to present authentication credentials to the smart network host device 120 for authenticating a related device, such as the computer 170. In other alternative embodiments, a user may manually authenticate a client device 130 with the smart network host device 120. For example, the user may log onto a management web page generated by the smart network host device 120 and manually enter authentication credentials, such as a printed code associated with the client device 130.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer.

The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

Figure 1C:
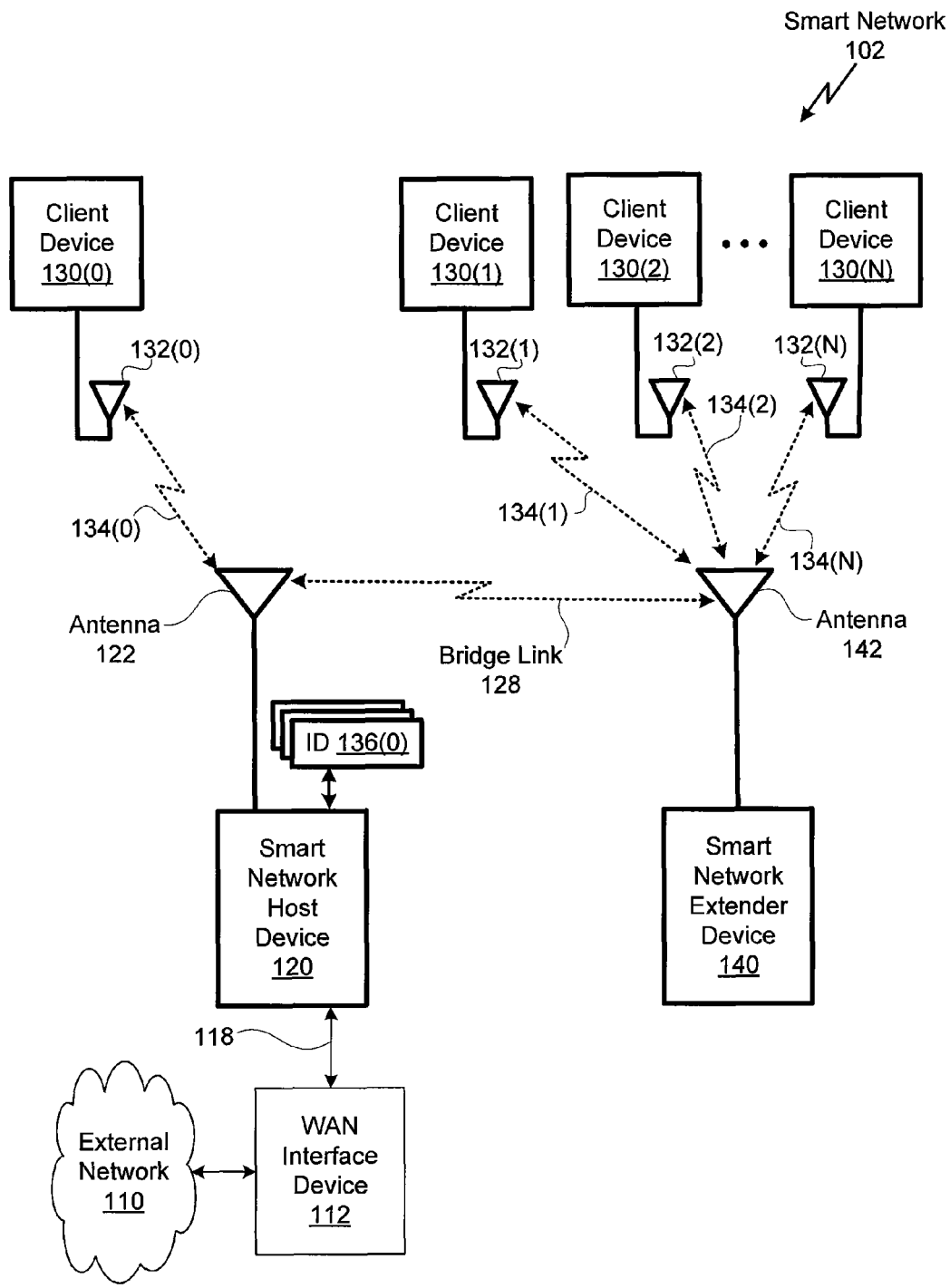
FIG. 1C illustrates the smart home network of FIG. 1A, according to another example embodiment of the present invention.

FIG. 1C illustrates the smart home network 102 of FIG. 1A, according to another example embodiment of the present invention. Here, the smart network 102 comprises a smart network host device 120, a smart network extender device 140, one or more client devices 130, and a wide area network (WAN) interface device 112, coupled to the external network 110 of FIG. 1A. The WAN interface device 112, smart network host device 120, and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1D:
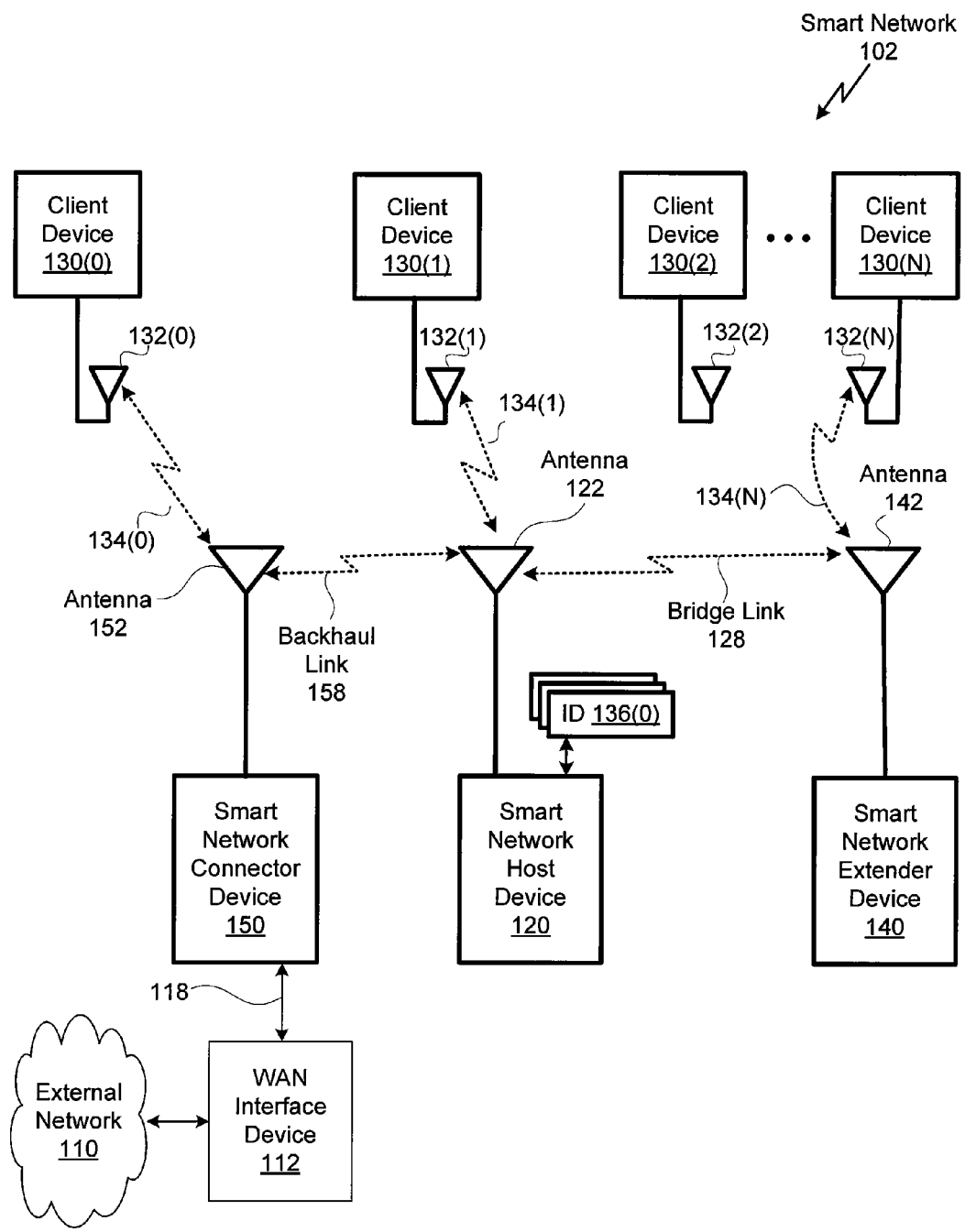
FIG. 1D illustrates the smart home network of FIG. 1A, according to yet another example embodiment of the present invention.

FIG. 1D illustrates the smart home network 102 of FIG. 1A, according to yet another example embodiment of the present invention. Here, the smart network 102 comprises a smart network host device 120, a smart network extender device 140, one or more client devices 130, a smart network connector device 150, and a wide area network (WAN) interface device 112, coupled to the external network 110 of FIG. 1A. The WAN interface device 112, smart network extender device 140, and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128, and backhaul link 158. This network data traffic is also forwarded by smart network extender device 140, smart network host device 120, and smart network connector device 150. A client device 130 may connect directly to any one of the network extender device 140, smart network host device 120, or smart network connector device 150. As shown, client device 130(0) is connected to smart network connector device 150 via wireless client link 134(0), client device 130(1) is connected to smart network host device 120 via wireless client link 134(1), and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
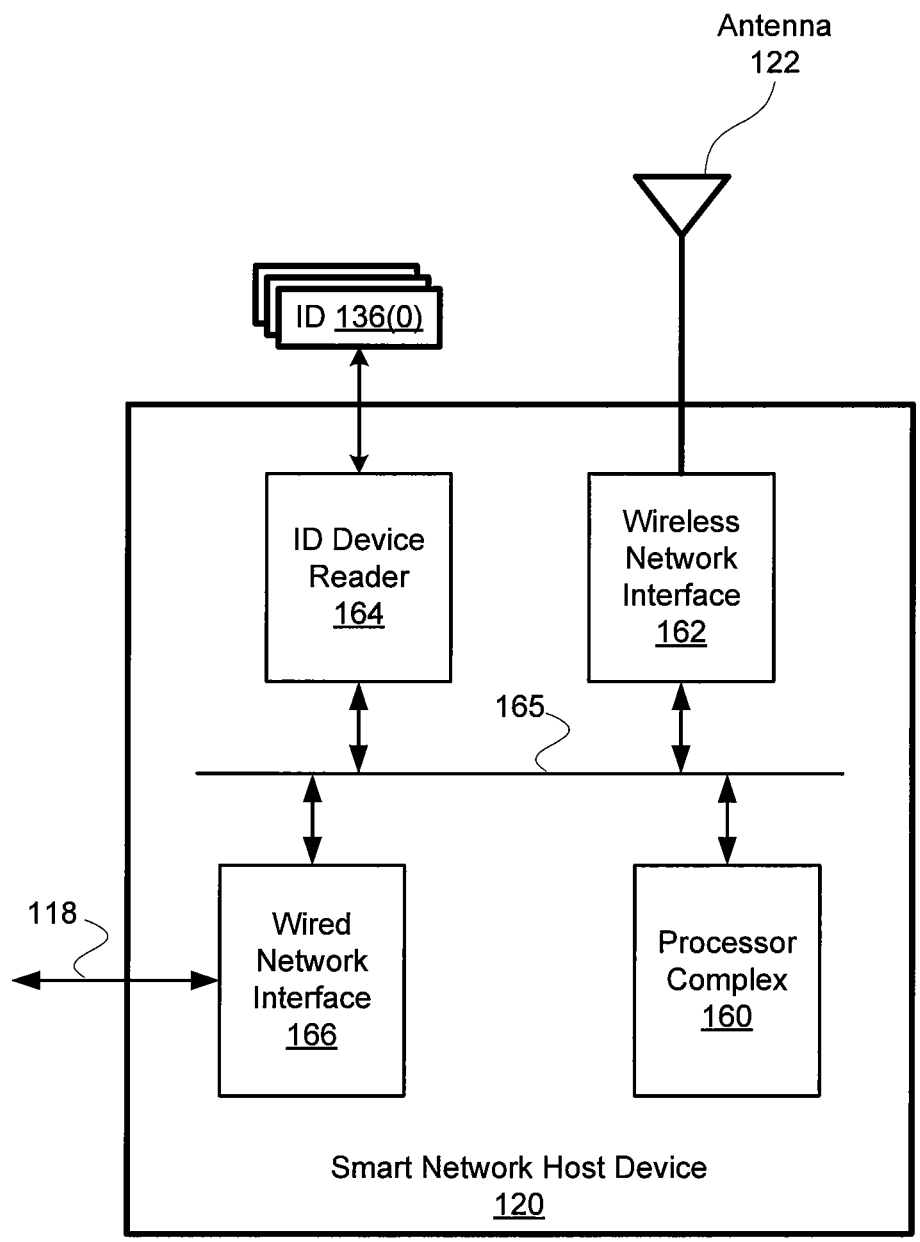
FIG. 1E is a more detailed illustration of the smart network host device of FIG. 1A, according to one example embodiment of the present invention.

FIG. 1E is a more detailed illustration of the smart network host device 120 of FIG. 1A, according to one example embodiment of the present invention. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader. In another embodiment, the ID device reader 164 may be implemented as an optical scanner for reading ID devices 136 that encode data via a printed bar code. In yet other embodiments, the ID device reader 164 may be configured to read data from other types of interfaces, such as other types of flash memories like an SD flash card.

In certain embodiments, the smart network host device 120 comprises one or more integrated circuits that implement respective functions of the smart network host device 120. For example, the processor complex 160, wired network interface 166, and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
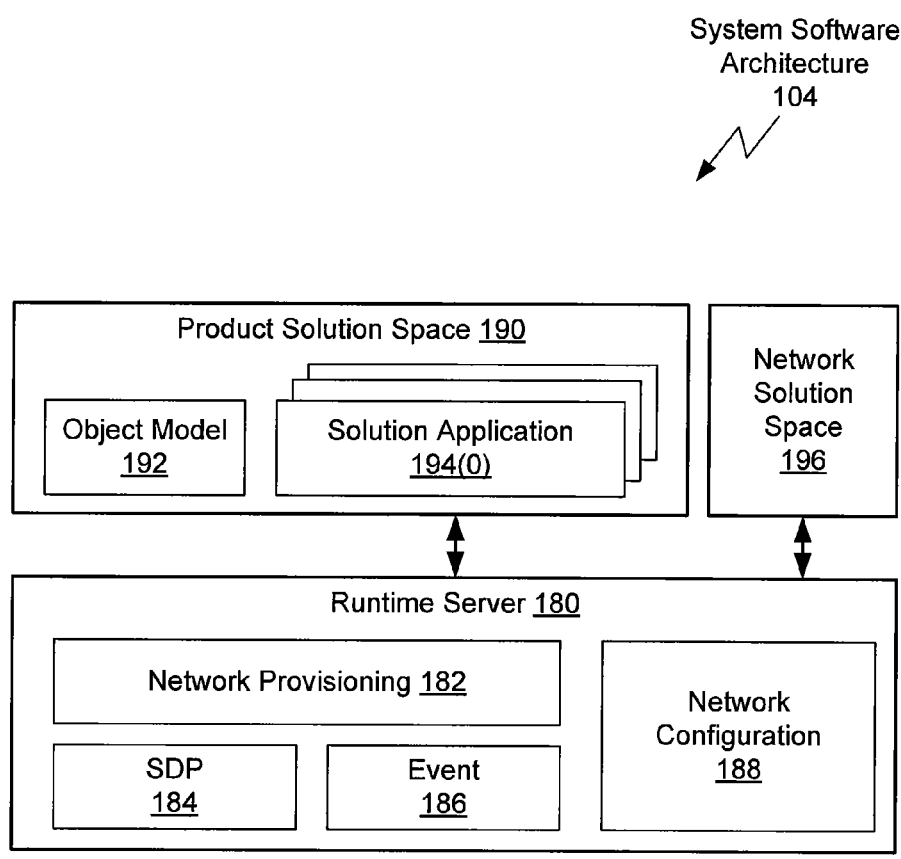
FIG. 1F illustrates a system software architecture for the smart network host device of FIG. 1E, according to one example embodiment of the present invention.

FIG. 1F illustrates a system software architecture for the smart network host device 120 of FIG. 1E, according to one example embodiment of the present invention. As shown, the software architecture 104 includes several software modules within the smart network host device 120. Programming instructions stored within the processor complex 160 implement a portion of the system software architecture 104 that includes a runtime server 180, a product solution space 190, and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras, and display devices. Exemplary services include device and service discovery, event tracking and generation, and state presentation for the different elements. In one embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning (SDP) module 184, an event module 186, and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

Embodiments of the invention provide systems and methods of automatically associating a device or service with a wireless network, such as the smart network 102. A network association apparatus includes identification information and an authorization credential associated with a specific device or service that can be connected to a wireless network. The apparatus is configured to automatically provide the identification information and the authorization credential in a secure fashion to a host of the wireless network when brought into close proximity to or physically connected with the host of the wireless network. In some example embodiments, the network association apparatus comprises one or more of ID devices 136(1)-136(N) described above in conjunction with FIG. 1B, and the host comprises the smart network host device 120, described above in conjunction with FIGS. 1A-1F.

Figure 2:
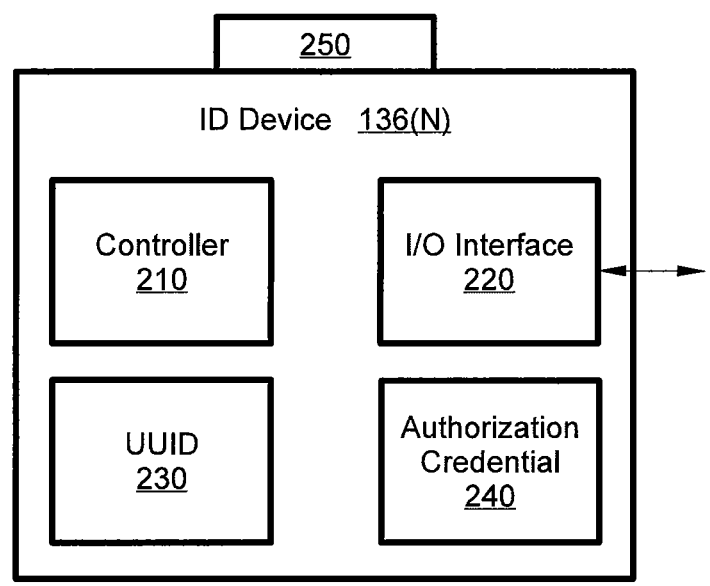
FIG. 2 illustrates a configuration of the ID device of FIG. 1B, according to an example embodiment of the present invention.

FIG. 2 illustrates a configuration of the ID device 136(N) of FIG. 1B, according to an example embodiment of the present invention. The ID device 136(N) is a portable apparatus that enables the smart network host device 120 to automatically associate a client device 130(N) or service with the smart network 102. When configured to provision the smart network 102 with identification information and authentication credentials for a client device 130(N) or service, the ID device 136(N) may have any of the configurations for the ID devices 130(0)-130(N) described above in conjunction with FIG. 1B. More generally, the ID device 136(N) may be any portable information-provisioning device that includes a data storage medium configured with a protected data storage region that retains the requisite identification information and authentication credentials for a specific client device 130(0)-130(N) or service. Suitable information-provisioning devices include USB drives that are manufactured with write-protected encrypted bits, writable RFID tags, optical disks with manufactured keys, secure digital (SD) memory cards with digital rights management (DRM) features, and the like. In some embodiments, ID device 136(N) may be configured without a storage medium, and includes a bar code, such as a two-dimensional quick response (QR) code. In such an embodiment, identification information and authentication credentials for a client device 130(N) or service are encoded in the bar code.

In the example embodiment illustrated in FIG. 2, the ID device 136(N) includes a controller 210, an I/O interface 220, a universally unique identifier (UUID) 230, and an authorization credential 240. The controller 210 is configured to execute the requisite functions for the operation of the ID device 136(N), and the I/O interface 220 is configured to enable communication between the ID device 136(N) and the smart network host device 120. In embodiments in which the ID device 136(N) comprises a near-field RFID tag, the controller 210 includes an integrated circuit for storing and processing information, modulating and demodulating a radio-frequency (RF) signal, and performing other specialized functions associated with the operation of the RFID tag. In such embodiments, the I/O interface 220 includes an antenna for receiving and transmitting the RF signal, and the UUID 230 and the authorization credential 240 may reside in the integrated circuit included in the controller 210. Alternatively, the UUID 230 and the authorization credential 240 may be stored in a memory that is part of the ID device 136(N). In other example embodiments, in which the ID device 136(N) does not comprise an RFID tag, the I/O interface 220 may include a USB port or other technically feasible interface for physically connecting the ID device 136(N) to the smart network host device 120.

The UUID 230 includes a unique reference number used as an identifier for the client device 130(N) that enables the smart network host device 120 to differentiate the client device 130(N) from other devices and services found in the network system 100. In some example embodiments, the UUID 230 is similar in format to globally unique identifiers (GUIDs), however, other formats known in the art suitable for the UUID 230 may be utilized without departing from the scope of the invention. For example, the UUID 230 may include the media access control address (MAC address) of the client device 130(N), in order to uniquely identify the client device 130(N). The MAC address of the client device 130(N) is a unique identifier that has no risk of name conflicts with any other devices in the smart network 102 or the network system 100. Thus, the ID device 136(N) can be permanently associated with the client device 130(N) via the UUID 230. In alternative embodiments, the ID device 136(N) may be configured such that UUID 230 may be written to the ID device 136(N) by the smart network host device 120 or other device, and therefore can be associated with a different client device 130(N) at a later time as desired by the user. For example, a UUID associated with the smart network 102 may be written to the ID device 136(N), and the ID device 136(N) may then be used to associate the smart network 102 with other smart networks on the network system 100.

The authorization credential 240, when obtained from the ID device 136(N) by the smart network host device 120, provides a layer of security to the smart network 102 when the smart network host device 120 sets up a secure connection between the smart network 102 and the client device 130(N). The authorization credential 240 may be an encrypted key for device-to-device authentication, in this case between the smart network host device 120 and the client device 130(N), and may be stored in or permanently written to the ID device 136(N) when the ID device 136(N) is manufactured. Thus, in some embodiments, the authorization credential 240 is stored in a write-protected storage medium, such as the write-protected encrypted bits of a USB drive or RFID tag, the manufactured key of an optical disk or SD memory card, or the like. The data included in the authorization credential 240 may be stored in any format known in the art suitable for authorization credentials without departing from the scope of the invention. In one example embodiment, the authorization credential 240 includes at least a portion of the MAC address of the client device 130(N). In some embodiments, the authorization credential 240 is a high-entropy key, such as a 128-bit key.

How the ID device 136(N) provides the UUID 230 and the authorization credential 240 to the smart network host device 120 depends on the configuration of the ID device 136(N). For example, when the ID device 136(N) comprises a USB drive with write-protected encrypted bits, the ID device 136(N) is detected by the smart network host device 120 when the ID device 136(N) is inserted into an appropriate USB port of the smart network host device 120, and the smart network host device 120 can obtain the UUID 230 and the authorization credential 240 using any technically feasible protocol. When the ID device 136(N) includes a bar code, the ID device 136(N) is scanned across a suitable bar code reader coupled to the smart network host device 120. When the ID device 136(N) comprises an RFID tag, connection to the smart network host device 120 can be as straight-forward as physically presenting the ID device 136(N) to the smart network host device 120. Thus, as soon as the ID device 136(N) is within a working radius of ID device reader 164 disposed in the smart network host device 120, e.g., within about 10 cm, the smart network host device 120 detects the ID device 136(N) and reads the UUID 230 and the authorization credential 240 from the ID device 136(N). Alternatively, the RFID reader in the smart network host device 120 may be configured to read information only from an RFID tag that is within the working radius of the RFID reader and also has a prescribed orientation with respect to the smart network host device 120, or is physically mounted in a specific location on the smart network host device 120. In such an example embodiment, faking of an RFID tag output signal is difficult to simulate, thereby preventing unwanted devices and/or services from being registered on the smart network 102 by the smart network host deice 120. Whether the ID device 136(N) comprises an RFID tag, a device that is physically connected to the smart network host device 120, or a bar code that is scanned in to the smart network host device 120, once the connection is made between the ID device 136(N) and the smart network host device 120, user involvement is no longer required for the client device 130(N) to be associated with the smart network 102 by the smart network host device 120.

In some embodiments of the invention, the ID device 136(N) includes a visual identifier 250 that is disposed on an outer surface of the ID device 136(N). The visual identifier 250 provide symbolic and/or numeric markings which indicate to the user the specific client device 130 or service that is associated with the ID device 136(N). The visual identifier 250 may include a logo of a company associated with the client device 130(N) or service associated with the ID device 136(N), an icon that represents the client device 130(N) or service, a serial number associated with the client device 130(N) or service, and/or a bar code that uniquely identifies the client device 130(N) or service. Thus, a user can quickly determine from multiple ID devices 136, which ID device 136(N) is associated with a specific client device 130. In order to conveniently differentiate between the ID devices 136 associated with similar client devices (e.g., multiple digital cameras), the visual identifier 250 may include both an iconic and a numeric component.

In operation, ID device 136(N) enables the smart network host device 120 to associate a specific client device 130(N) with the smart network 102. The ID device 136(N) is a physical representation of the client device 130(N) that greatly simplifies the role of a user of the smart network 102 when adding the client device 130(N) or a service to the smart network 102, since the UUID 230 and the authorization credential 240 are automatically obtained by the smart network host device 120. Further, an additional layer of security is provided to the smart network 102 since the UUID 230 and the authorization credential 240 can only be obtained by the smart network host device 120 when a suitable ID device 136(N) is positioned in close proximity to or physically connected to the smart network host device 120. In this way, the smart network host device 120 obtains the UUID 230 and the authorization credential 240 in a convenient and secure fashion, and can automatically associate the client device 130(N) that is paired to the ID device 136(N) with the smart network 102 with little risk of the authorization credential 240 being spoofed, or an unauthorized UUID being accepted by the smart network host device 120. In some embodiments, as an added layer of security, the smart network host device 120 is configured to automatically disassociate the client device 130(N) or service associated with the ID device 136(N) and the smart network 102 when the ID device 136(N) is detected to be no longer in close proximity to or physically connected to the smart network host device 120.

Figure 3:
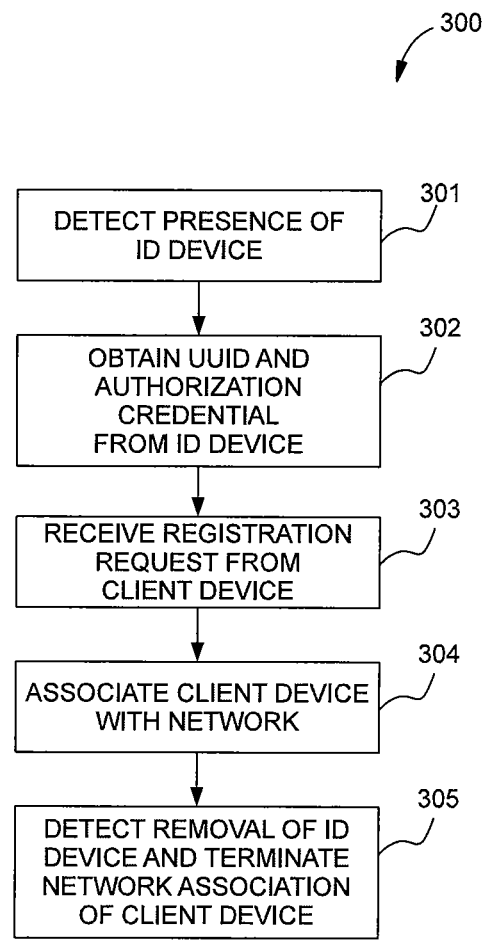
FIG. 3 is a flowchart of method steps for automatically associating a client device or service with a smart network, according to one example embodiment of the present invention.

FIG. 3 is a flowchart of method steps for automatically associating a client device or service with a smart network, according to one example embodiment of the present invention. Although the method steps are described in conjunction with the smart network 102 of FIG. 1 and the configuration of the ID device 136(N) illustrated in FIG. 2, persons skilled in the art will understand that any wireless network and ID device configured to perform the method steps, in any order, is within the scope of the invention.

As shown, the method 300 begins at step 301, where the smart network host device 120 detects the presence of the ID device 136(N), which is associated with the client device 130(N) or a service that can be connected to smart network 102. In one embodiment, the ID device 136(N) may be detected when mounted in a prescribed fashion on a surface of the smart network host device 120 and ID device reader 164 in the smart network host device 120 detects the presence of an RFID tag included in the ID device 136(N) once the ID device 136(N) is within the near field of the reader. In another embodiment, the ID device 136(N) may be swiped near the ID device reader 164.

In step 302, the smart network host device 120 automatically obtains from the ID device 136(N) the UUID 230 and the authorization credential 240 for the client device 130(N) or service associated with the ID device 136(N). The UUID 230 and the authorization credential 240 may be obtained placing the ID device 136(N) near the smart network host device 120, or by physically connecting the ID device 136(N) to the smart network host device 120 via a USB port or other technically feasible connection mechanism. In an alternative embodiment, the UUID 230 and the authorization credential 240 may be encoded in a printable medium, such as a bar code, and read by swiping the bar code under an optical scanner included in the smart network host 120.

In step 303, the smart network host device 120 receives a registration request from the client device 130(N) or a service associated with the ID device 136(N). Such a registration request may take place when the client device 130(N) is first powered up, rebooted, etc. within the operational radius of the antenna 122 of the smart network host device 120. Upon receiving the registration request, the smart network host device 120 then updates the network state model 178 in FIG. 1A to include the new client device 130(N) and/or service. In an alternative embodiment, the registration request from the client device 130(N) may be received by any access point of the smart network 102, including smart network extender device 140 and smart network connector device 150.

In step 304, the smart network host device 120 associates the client device 130(N) or the desired service with the smart network 102 based on the UUID 230 and the authorization credential 240 obtained from the ID device 136(N) in step 301. In some example embodiments, the smart network host device 102 may set up a secure connection between the smart network 102 and the client device 130(N) or service using a protocol handshake between the client device 130(N) and the smart network host device 120. Such a protocol includes a dual challenge mechanism, in which the authorization credential 240 is never broadcast between the client device 130 (N) and the smart network host device 120. Instead, using encryption algorithms known in the art, the client device 130(N) proves to the smart network host device 120 that the client device 130(N) knows the authorization credential 240 and the smart network host device 120 proves to the client device 130(N) that the smart network host device 120 also knows the authorization credential 240. If either device fails to provide the correct information during such a protocol handshake, the other device terminates the session and no network connection will be established therebetween.

In some embodiments, an additional step 305 may be performed when a user has removed the ID device 136(N) from close proximity of the smart network host device 120. In step 305, the smart network host device 120 detects that the ID device 136(N) is no longer present, and, in response, automatically terminates the association of the client device 130 (N) to the smart network 102. Thus, in such embodiments, a user may disconnect a client device or service by simply removing the associated ID device 136(N) from the smart network host device 120.

In sum, example embodiments of the invention provide systems and methods for automatically associating a client device or service with a smart network. A network association apparatus automatically provides identification information and an authorization credential that are associated with the client device or service to be connected to a wireless network. The network association apparatus advantageously enables the host device of the wireless network to automatically associate the client device or service to the wireless network with little or no user involvement required, while providing an additional layer of security to the process of accessing the wireless network. The added security layer stems from the required possession by a user of the network association apparatus and the proximity of the network association apparatus to the smart network host device in order to associate a client device or service to the smart network.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments of the present invention, other and further embodiments of the invention may be devised without departing from the basic scope thereof. Therefore, the scope of the present invention is determined by the claims that follow.

We claim:
1. An apparatus, comprising:
a memory including,
identification information for identifying a client device when connecting the client device to a wireless network, wherein the apparatus is physically separate from the client device, and
an authorization credential associated with the client device, wherein the identification information and the authorization credential are globally unique to the client device on the wireless network; and
a controller coupled to the memory and configured to:
receive the identification information from the client device; and
automatically provide the identification information and the authorization credential to a host device of the wireless network upon becoming communicatively connected with the host device,
wherein the host device is configured to:
automatically associate the client device with the wireless network using the identification information and the authorization credential, and automatically disassociate the client device with the wireless network when the apparatus is detected to be no longer in close proximity to or physically connected to the host device, wherein the apparatus is one of a near-field radio frequency identification (RFID) tag, a universal serial bus (USB) drive manufactured with write-protected encrypted bits, an optical disk with manufactured keys, or a secure digital (SD) memory card with digital rights management (DRM) features.

2. The apparatus of claim 1, wherein the identification information includes a media access control (MAC) address of the client device.

3. The apparatus of claim 1, further comprising a visual identifier disposed on an outer surface of the apparatus.

4. The apparatus of claim 3, wherein the visual identifier comprises at least one of a logo of a company associated with the client device, an icon that represents the client device, a serial number associated with the client device, or a bar code that uniquely identifies the client device.

5. The apparatus of claim 1, wherein the apparatus becomes communicatively connected to the host device when the apparatus at least one of (i) comes within close proximity of the host device and (ii) is physically connected to the host device such that communication to the host device is established.

6. The apparatus of claim 1, wherein the memory further includes a write-protected region and the identification information and the authorization credential are disposed in the write-protected region.

7. The apparatus of claim 1, wherein the memory further includes a writable region configured to store information from the host device of the wireless network.

8. The apparatus of claim 1, wherein the apparatus is a near-field RFID tag and is configured to automatically provide the identification information and the authorization credential to the host device of the wireless network only when in close proximity to the host device of the wireless network.

9. A system, comprising:
a network association apparatus comprising:
  a memory comprising:
    identification information for identifying a client device when connecting the client device to a wireless network, wherein the network association apparatus is physically separate from the client device, and
    an authorization credential associated with the client device, wherein the identification information and the authorization credential are globally unique to the client device on the wireless network; and
  a controller coupled to the memory and configured to:
    receive the identification information and the authorization credential from the client device; and
    provide the identification information and the authorization credential to a host device of the wireless network upon becoming communicatively connected with the host device;
wherein the network association apparatus is one of a near-field radio frequency identification (RFID) tag, a universal serial bus (USB) drive manufactured with write-protected encrypted bits, an optical disk with manufactured keys, or a secure digital (SD) memory card with digital rights management (DRM) features; and the host device of the wireless network configured to:
  automatically obtain the identification information and the authorization credential from the network association apparatus,
  automatically associate the client device with the wireless network using the identification information and the authorization credential, and
  automatically disassociate the client device with the wireless network when the network association apparatus is detected to be no longer in close proximity to or physically connected to the host device.

10. The system of claim 9, wherein the network association apparatus is configured to automatically provide the identification information and the authorization credential to the host device only when the network association apparatus come within close proximity to or is physically connected to the host device such that communication to the host device is established.

11. The system of claim 10, wherein the network association apparatus is a near-field RFID tag and is configured to automatically provide the identification information and the authorization credential to a host device of the wireless network only when presented to the host device of the wireless network in a prescribed orientation with respect to the host device.

12. The system of claim 9, wherein the identification information includes a media access control (MAC) address of the client device.

13. The system of claim 9, wherein the network association apparatus is configured to be mounted on the host device.

14. A method, comprising:
detecting an apparatus associated with a client device becoming communicatively connected with a host device, wherein the apparatus is physically separate from the client device and is one of a near-field radio frequency identification (RFID) tag, a universal serial bus (USB) drive manufactured with write-protected encrypted bits, an optical disk with manufactured keys, or a secure digital (SD) memory card with digital rights management (DRM) features;
automatically receiving, at the host device of a wireless network, identification information and an authorization credential associated with the client device from the apparatus, wherein the identification information and the authorization credential are globally unique to the client device on the wireless network;
receiving at the host device a registration request from the client device;
upon receiving the registration request, connecting the client device to the wireless network based on the identification information and the authorization credential, wherein the identification information identifies the client device;
detecting that the apparatus is no longer in close proximity to or physically connected to the host device; and
in response to detecting that the apparatus is no longer present, automatically terminating the connection of the client device to the wireless network.

* * * * *